Dec. 29, 1925.                                              1,567,304
                        W. H. SMITH
                       MANIFOLD HEATER
                    Filed Dec. 31, 1924            2 Sheets-Sheet 2

Inventor
W. H. Smith
By Bryant & Lowry
Attorneys

Patented Dec. 29, 1925.

1,567,304

UNITED STATES PATENT OFFICE.

WILLIAM H. SMITH, OF BRIDGEPORT, CONNECTICUT.

MANIFOLD HEATER.

Application filed December 31, 1924. Serial No. 759,163.

*To all whom it may concern:*

Be it known that I, WILLIAM H. SMITH, a citizen of the United States of America, residing at Bridgeport, in the county of Fairfield and State of Connecticut, have invented certain new and useful Improvements in Manifold Heaters, of which the following is a specification.

This invention relates to improvements in manifold heaters.

The primary object of the invention is to provide improved means for heating the intake manifold of an internal combustion engine, during the operation of the latter, for thoroughly vaporizing the fuel passing through the said manifold for the purpose of economizing in the consumption of fuel.

A further object of the invention is to provide means for heating the intake manifold of an engine to facilitate starting of the latter during cold weather.

Other objects and advantages of the invention will be apparent during the course of the following description.

Figure 1:
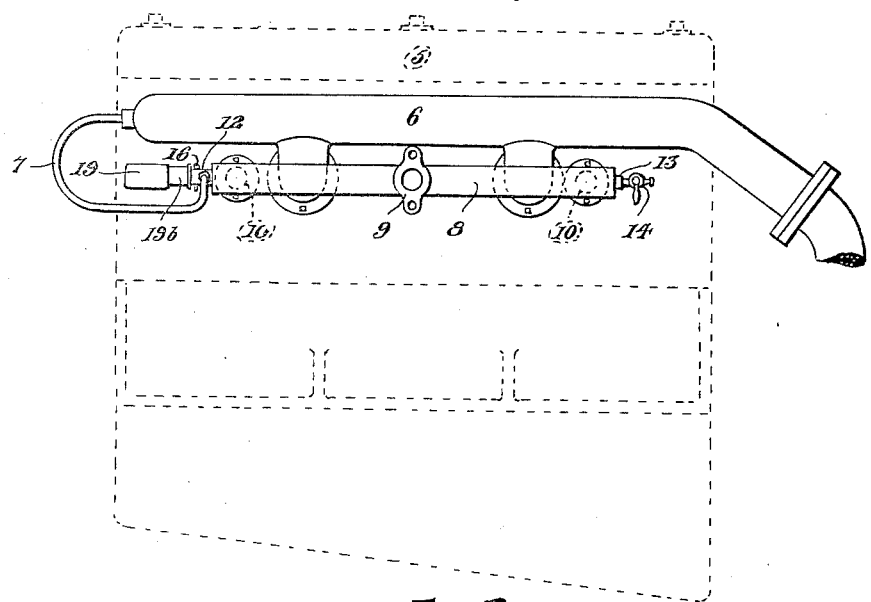
Figure 2:
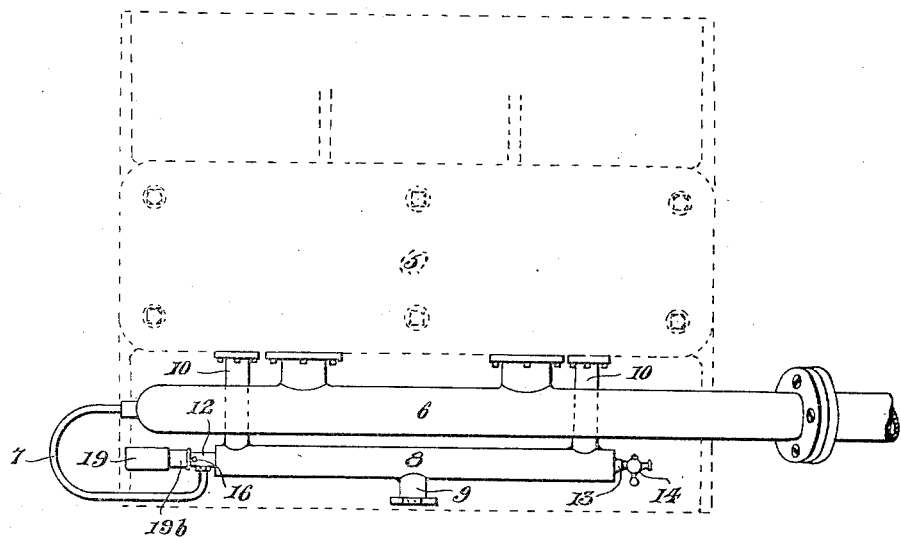
Figure 3:
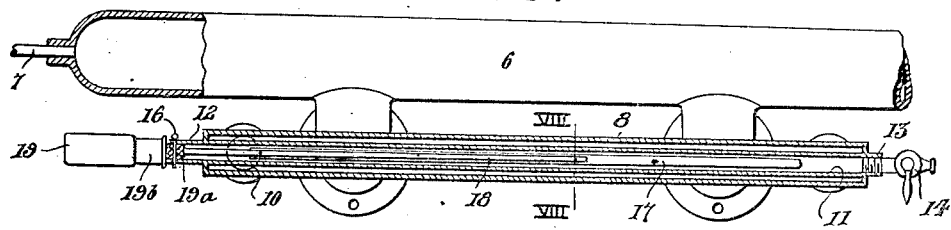
Figure 4:
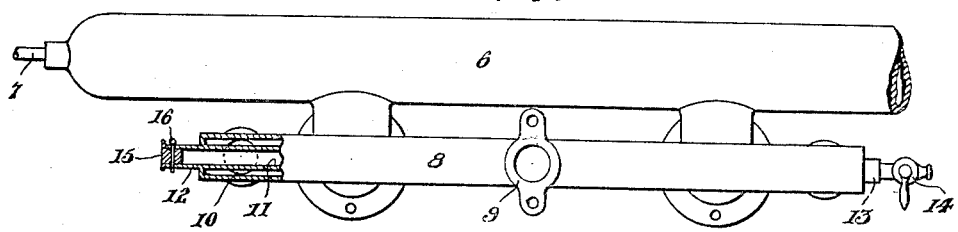

In the accompanying drawings forming a part of this specification and in which like numerals are employed to designate like parts throughout the same, Figure 1 is a side elevational view of the apparatus embodying this invention shown operatively associated with an internal combustion engine, illustrated in dotted lines, Figure 2 is a top plan view of the structure shown in Fig 1, Figure 3 is a detail side elevational view, partly in vertical section, of the apparatus embodying this invention, Figure 4 is a fragmentary side elevational view of the device as shown in Fig. 1 and illustrates in section one end of the heating chamber formed in the intake manifold.

Figure 5:
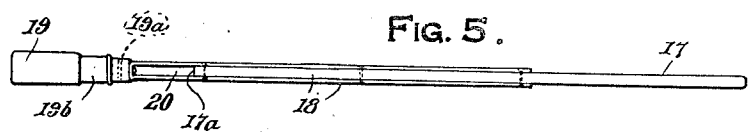
Figure 6:
Figure 7:
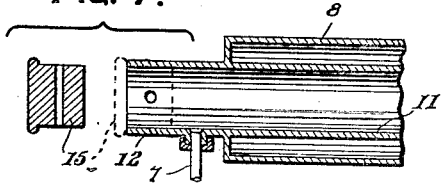
Figure 8:
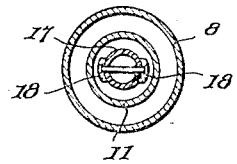
Figure 9:
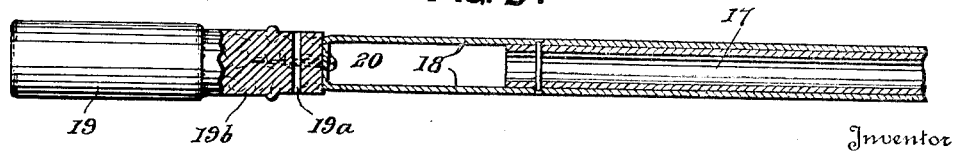

Figure 5 is a detail elevational view of a heating element employed for heating the intake manifold of a cold engine to facilitate starting of the same, Figure 6 is a modified form of heating element adapted to be used in the same manner as the element shown in Fig. 5, Figure 7 is a fragmentary horizontal sectional view of one end of the intake manifold and its heating chamber with a removable plug adapted for closing one end of the same, Figure 8 is a transverse sectional view taken upon line VIII—VIII of Fig. 3, and Figure 9 is a longitudinal sectional view, partly in elevation, of the heating element illustrated in Fig. 5.

In the drawings, wherein for the purpose of illustration is shown a preferred embodiment of this invention, the numeral 5 designates an internal combustion engine, in its entirety, to which is suitably attached the exhaust manifold 6, which may be of any conventional form having a tubular extension 7 connected to one end thereof. The purpose of this extension will be completely set forth as the description proceeds.

The engine 5 is further provided with an intake manifold 8 having the connection 9 for a carbureter and the branch pipes 10 for feeding carbureted or explosive mixture to the engine cylinders.

The intake manifold 8 is formed with an axially extending chamber 11 which projects beyond the opposite ends of the said manifold, as at 12 and 13, and is open at the said projecting ends. The free end of the manifold extension 7 is suitably attached to the chamber extension 12 and communicates with the bore of the same, as best illustrated in Fig. 7. The bore of the chamber extension 13 is threaded for the reception of the valve structure 14. During normal operation of the engine equipped with the apparatus embodying this invention, the open end extension 12 is closed by the removable plug 15 which is retained in position by the cotter pin, or other similar element, 16.

It will now be understood that while the engine is running, exhaust gases will be fed from the manifold 6 through the extension 7 to the bore of the chamber 11 and that by controlling the discharge of this exhaust gas, by means of the valve structure 14, the same may be allowed to escape at any speed desired. This feeding of exhaust gases into the chamber 11 will cause the walls of the latter to be heated. This heating of the walls of the chamber 11 will cause the fuel passing through the intake manifold 8 to be thoroughly heated for vaporizing the same.

To facilitate the starting of the engine, equipped with this apparatus, during cold weather, the heating elements illustrated in Figs. 5, 6 and 9 are provided. The heating element shown in Figs. 5 and 9 consists of a section of pipe, or the like, 17 which is suitably secured to the U-shaped carrier 18 having the handle member 19 suitably attached thereto. In Fig. 9, this handle 19 is shown as having a shank 19$^b$ which is provided with a transversly extending opening 19$^a$. It will be noticed that the end of the U-shaped carrier 18, to which the handle 19 is attached, is spaced from the end 17$^a$ of the heating element 17. This space 20, when the heating element is inserted into the bore of the chamber 11, as illustrated in Fig. 3, will permit the unobstructed passage of the exhaust gases into the chamber 11.

It is intended that the section of pipe 17 be heated by any suitable burner, stove, or the like, prior to being inserted in the chamber 11. This heat carried by the pipe 17 will remove the chill from the intake manifold and facilitate starting the engine in cold weather.

The heating element illustrated in Fig. 6 includes a casing 21 within which any suitable form of electric heating unit may be positioned and supplied with current by means of the electric wires 21$^a$.

It will now be seen that by positioning either of the heating elements as shown in Figs. 5 and 6, within the bore of the chamber 11, the walls of the latter will be heated for causing the heating of fuel within the intake manifold 8. This heating of the fuel in the manifold will cause the same to vaporize and will greatly aid the starting of the engine.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. The combination with an internal combustion engine having an exhaust manifold, of an intake manifold, an elongated chamber formed in the intake manifold and having its opposite open end portions projecting therefrom, one of said projecting portions having a lateral inlet and the other having its opening controlled by a valve structure, a removable heating element positioned within the bore of the chamber through the open end having the lateral inlet, and means for feeding exhaust gases from the exhaust manifold to the inlet of the chamber.

2. The combination with an internal combustion engine having an exhaust manifold, of an intake manifold, an elongated chamber formed in the intake manifold and projecting therefrom at its opposite ends, one of said projecting ends being open and the other projecting end being closed by a valve structure, and a removable electric heating element positioned within the bore of the chamber through the open end.

3. The combination with an internal combustion engine having an exhaust manifold, of an intake manifold, an elongated chamber formed in the intake manifold and having its opposite end portions projecting therefrom, one of said projecting portions having a lateral inlet and the other having its opening controlled by a valve structure, a removable electric heating element positioned within the bore of the chamber through the open end having the lateral inlet, means for preventing unintentional removal of the heating element, and a tubular extension from the exhaust manifold communicating with the inlet of the chamber for feeding exhaust gases into the latter.

In testimony whereof I affix my signature.

WILLIAM H. SMITH.